United States Patent [19]

Kluger

[11] 4,383,103
[45] May 10, 1983

[54] AMINOALKOXYAMIDES AND EPOXY RESIN COMPOSITIONS CONTAINING SAME

[75] Inventor: Edward W. Kluger, Pauline, S.C.

[73] Assignee: Milliken Research Corporation, Spartanburg, S.C.

[21] Appl. No.: 346,720

[22] Filed: Feb. 8, 1982

[51] Int. Cl.³ .............................................. C08G 59/54
[52] U.S. Cl. .................................... 528/111; 528/310; 564/198
[58] Field of Search ................. 564/198; 528/111, 310

[56] References Cited

U.S. PATENT DOCUMENTS

| | | | |
|---|---|---|---|
| 4,351,934 | 9/1982 | Kluger et al. | 528/111 |
| 4,352,919 | 10/1982 | Kluger et al. | 528/111 |
| 4,352,920 | 10/1982 | Kluger | 528/111 |

*Primary Examiner*—Earl A. Nielsen
*Attorney, Agent, or Firm*—H. William Petry; Terry T. Moyer

[57] ABSTRACT

Aminoalkoxyamides are provided of the formula:

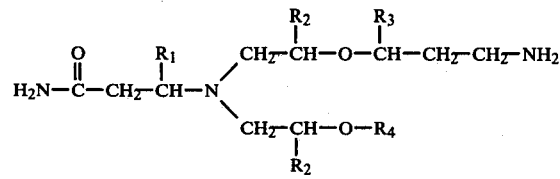

wherein $R_4$ is selected from H and

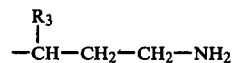

and $R_1$, $R_2$ and $R_3$ are all independently selected from H or a lower alkyl group having from 1 to about 6 carbon atoms. Also provided are epoxy resin compositions containing such amine-containing compounds as epoxy curing agents and methods for curing epoxy resins where such curing agents may be employed.

9 Claims, No Drawings

AMINOALKOXYAMIDES AND EPOXY RESIN COMPOSITIONS CONTAINING SAME

The present invention relates to aminoalkoxyamides and to methods for curing epoxy resins wherein such aminoalkoxyamides are employed as a curing agent. The present invention also relates to epoxy resin compositions containing aminoalkoxyamides as epoxy curing agents.

Epoxy resins were first introduced commercially in the United States in about 1950, and since then their use has grown rapidly. Epoxy resins may be broadly defined as resinous intermediate materials which are characterized by the presence of the epoxy group

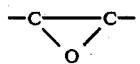

In general, epoxy resins are not used by themselves but rather they require the addition of a curing agent or hardener to convert them into a thermoset material. Epoxy resins have gained wide acceptance in structural applications and in protective coatings because of their generally excellent toughness, adhesion, chemical resistance, and electrical properties. The combination of these properties is generally not found in any other single plastic material.

A relatively large number of chemical reagents were available or known to have utility as curing agents or hardeners which may be added to epoxy resins to convert them to thermoset materials. It is also known that in the curing process both the epoxy and the hydroxyl groups of the resin may be involved. Curing agents are available whereby curing may be accomplished at room temperature or upon heating. Curing may take place in general either by a coupling or addition process, or by catalytic polymerization.

The known curing agents or hardeners for epoxy resins fall into three categories: (1) the acidic type, e.g., acid anhydrides; (2) aldehyde condensation products, e.g., phenol-, urea-, and melamine-formaldehyde resins; and (3) amine type, e.g., aliphatic and aromatic amines, polyamides, tertiary amines, and amine adducts. The novel aminoalkoxyamines of the present invention may be employed as the third type, namely the amine type, of epoxy curing agent.

The aminoalkoxyamides of the present invention may be represented by the following structural formula:

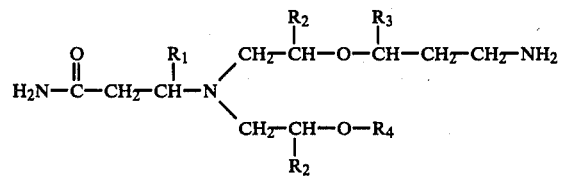

wherein $R_4$ is selected from H and

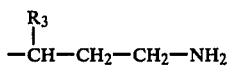

and $R_1$, $R_2$ and $R_3$ are all independently selected from H and a lower alkyl group having from 1 to about 6 carbon atoms. Preferably in the above structural formula $R_4$ is independently selected from

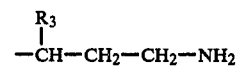

Even more preferably the amide employed to prepare the novel compounds is acrylamide so that $R_1$ is H. The $R_2$ and $R_3$ sustituents are preferably H.

The present invention also relates to the use of such compounds as epoxy curing agents and to epoxy resin compositions which contain 100 parts by weight of at least one epoxy resin and from about 15 parts to about 50 parts, preferably about 20 parts to about 30 parts by weight of the aminoalkoxyamides of the invention. Such cured products have good flexibility and excellent solvent resistance.

The aminoalkoxyamides of the present invention may be prepared quite conveniently by a two-step process involving, as the first step amidoalkylation of a dialkanolamine of the formula:

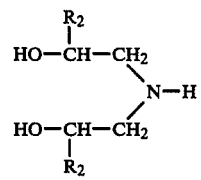

wherein $R_2$ is an indicated above. Such amidoalkylation is described and claimed in a copending, commonly assigned U.S. patent application having the same filing date as the present application, entitled "Amidodicyanoalkanolamines and Process for Selective Cyanoalkylation of Amidodialkanolamines," Edward W. Kluger, Ser. No. 346,788. That application is incorporated herein by reference. The cyanoalkylated amido products prepared according to applicants's copending application may, for the purposes of the present application, by represented as follows:

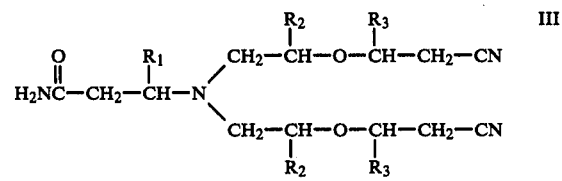

wherein $R_2$ and $R_3$ are as indicated above. As indicated above and in my copending application the preferred amidoalkylating agent is acrylonitrile so that in the above structural formula $R_1$ is H. Also, $R_2$ and $R_3$ are preferably both H, so that such preferred compound is bis-(-3-aminopropoxy)-N-propionamidodiethanolamine. For convenience the second step in the preparation of the invention will be described with particular reference to this preferred compound although it is to be understood that the invention is not to be limited thereby.

The second step in the preparation of the compounds of the present invention involves hydrogenation of the cyanoalkylated amidodialkanolamine (Structure III). Such hydrogenation may be accomplished in general with hydrogen and ammonia in the presence of a suitable metal catalyst. Such hydrogenation may further be accomplished either in the presence of a solvent or in the absence thereof. The products produced according to such hydrogenation may include the corresponding amidotriamine, say if all the cyano groups are reduced and there is no cleavage; amidodiamine, if one functional group is cleaved during the hydrogenation and so forth. In essence it is believed that virtually all of the amine compounds of the invention (Structure I) may be produced pursuant to such hydrogenation depending upon the extent of cleavage that occurs in the hydrogenation reaction. Preferably, however, the product composition will contain a predominant portion, e.g., at least about 80 percent and preferably at least about 90 percent of the amidotriamine, that is the compound represented by Structure I wherein $R_4$ is

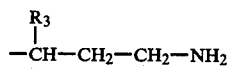

and where $R_1$, $R_2$ and $R_3$ have the values indicated above.

A preferred embodiment of the invention will be set forth with particular reference to the cyanoethylated intermediate bis-(-2-cyanoethoxy)-N-propionamidodiethanolamine. Reduction of this compound may be accomplished according to the invention to produce the corresponding tetra amine in high yield as shown by the following equation:

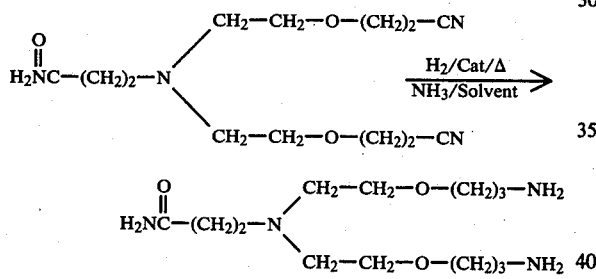

The temperature at which the above described reduction of aminoamidodinitrile is carried out can vary widely. However, generally the temperature may be within a range of from about 30°–150° C. and preferably in the range of 80°–125° C. Likewise, the period of time required for the reaction to go to substantial completion can vary widely, such being dependent on the hydrogen pressure and the particular catalyst employed as well as the temperature at which such reaction is carried out. Generally, however, the reaction proceeds to completion when the reactants are contacted at the required temperature for from about 0.5 to about 4 hours.

Pressures in the range of about 1000 to about 5000 psi may be used to accomplish the reduction. While pressure in the higher range (2100–5000 psi) can be used and may be advantageous, the preferable range of pressure is 1000–2000 psi. The use of ammonia in this reduction is for the purpose of maintaining high yields of the corresponding amidotriamine. The presence of ammonia may serve to inhibit formation of secondary amines. The amount of ammonia used may vary from 5 moles of ammonia per mole of aminoamidodinitrile to 30 moles per mole of aminoamidodinitrile. Preferably 12 to about 20 moles of ammonia are used per mole of aminoamidodinitrile.

The hydrogenation of the aminoamidodinitrile may be carried out in the presence or absence of a solvent. When solvent is employed, any suitable solvent which will not interfere with the desired hyrogenation can be employed, such as cycloaliphatic ethers, e.g., dioxane, tetrahydrofuran, and the like and higher boiling hydrocarbons, e.g., hexane, cyclohexane, heptane, decane, toluene, xylenes and the like, and alcohols, e.g., methyl alcohol, ethyl alcohol, isopropyl alcohol, isobutyl alcohol and the like.

In carrying out the reduction of the aminoamidodinitrile any suitable reduction catalyst can be employed. Typical of such reduction catalysts are Raney nickel, cobalt, palladium, platinum, ruthenium, rhodium, osmium, iridium, iron, including salts and oxides thereof and the like. Further, such catalysts can be in their free metal state or extended on a support such as charcoal, aluminum, kieselguhr and the like.

The amount of catalyst employed in the reduction may vary widely. Generally, however, the amount of catalyst will vary from about 1 to 30 weight percent, preferably from about 5 to 10 weight percent.

The process of reducing the aminoamidodinitrile has been described as a batch operation carried out in a high pressure stirred autoclave. However, other reducing modes will give equally good results. A continuous flow reactor may be used with suspended or fixed bed solid catalyst operating at the proper temperature, pressure, and flow rate to give the desired reduction. Alternatively, the desired reduction can be accomplished by incremental addition of the aminoamidodinitrile to a batch type reactor at the proper described operating conditions.

One particularly important use for the novel compounds of the present invention is their use as epoxy curing agents for polyepoxides. The polyepoxides which can be cured at elevated temperatures using the amino compounds as herein described are those polyepoxides possessing at least two

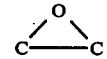

groups. These groups may be terminal, i.e.,

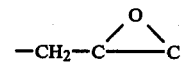

groups, or they may be in an internal position. However, especially desirable results can be obtained when the epoxy groups are terminal. The polyepoxides may be saturated or unsaturated, aliphatic, cycloaliphatic, aromatic or heterocyclic, and may be substituted such as with hydroxyl groups, ether radicals and the like. Further, the polyepoxides can be monomeric or polymeric. Such polyepoxides, and their preparation, are well known in the art.

The curing of the polyepoxides with the above-described amino compound curing agents of the present invention may be accomplished by simply mixing the two components together. While the reaction between the two components may occur slowly at room temperature, improved results can be obtained if the mixture is heated to a temperature of from about 50° C. to about 280° C. for a period of time of from about 1 to about 12 hours and thereafter post-curing the reaction product for an additional period of time of from about 1 to about 8 hours at a temperature of from about 140° C. to about 225° C. With a small casting, curing of the reaction mixture can be obtained by heating the reaction mixture for about 2 hours at a temperature of from about 80° C. to about 100° C. and thereafter post-curing the reaction product at a temperature of from about 140° C. to about 225° C. for an additional 2 hours or so.

In curing polyepoxides it is generally desirable that the polyepoxide be in a mobile condition when the curing agent is added to ensure uniform mixing. If the polyepoxide is extremely viscous or solid at room or casting temperature, the polyepoxide may be heated to reduce the viscosity or a volatile liquid solvent, which can escape from the polyepoxide composition containing the novel amino compound curing agent by evaporation before and/or during the curing of such polyepoxide composition, can be added to the polyepoxide to reduce its viscosity. Typical of such volatile liquid solvents are ketones, such as acetone, methyl ethyl ketone and the like, ethers, such as ethyl acetate, butyl acetate and the like, ether alcohols, such as methyl, ethyl or butyl ethers of ethylene glycol and chlorinated hydrocarbons, such as chloroform.

In addition to the use of the amino compounds of the present invention as epoxy curing agents, many other uses can readily be envisioned by those skilled in the art. Thus not only do the compounds of the present invention find utility as epoxy curing agents but such compounds can be employed as oil and fuel adductive intermediates. Further, the polyamines may be employed for the formation of polyisocyanate compositions for the incorporation into polyurethane compositions, and the compound may be further reacted to form novel and useful polyamides.

In order to more fully describe the preparation and use of the novel compounds of the present invention the following examples are given. However, such examples are presented for illustration only and are not to be construed as unduly limiting the scope of the present invention. Unless otherwise indicated, all parts and/or percentages given in these examples are by weight.

EXAMPLE 1

In a two liter stirred autoclave was charged 268 gms of bis-(-2-cyanoethoxy)-N-propionamidodiethanolamine, 268 gms of toluene, and 150 gms of wet Raney No. 28 nickel catalyst (75 gms on dry basis). The autoclave was pressure checked to 2000 psi with hydrogen for leaks. Afterwards, 100 gms of liquid ammonia was charged. The pressure was then adjusted to 400 psi with hydrogen gas and the autoclave was heated to 120°-130° C. where a pressure of 1600-1700 psi developed. Samples were pulled from the autoclave and analyzed until the reaction was near completion. After 30 minutes at 120°-130° C., the reactor was post-heated at 145°-150° C. for an additional 15 minutes. The autoclave was then cooled and the contents were emptied. The excess ammonia, toluene and any N-propylamine were removed from the product under vacuum (15-30 mmHg) to give a colorless liquid. An IR spectrum of the final stripped bis-(-3-aminopropoxy)-N-propionamidodiethanolamine indicated that all the nitrile groups had been reduced. A potentiometric titration of the product with 1 N HCl resulted in a neutralization equivalent of 10.10 milliequivalents of HCl per/gm of product. The theoretical value for bis-(-3-aminopropoxy)-N-propionamidodiethanolamine (MWT=290 g/mole) was calculated to be 10.34 milliequivalents of HCl per gm of amidotriamine which is in good agreement with the observed experimental value. The product was used without further purification.

EXAMPLE 2

In a two liter stirred autoclave was charged 250 gms of bis-(-2-cyanoethoxy)-N-propionamidodiisopropanolamine, 250 gms of toluene and 150 gms of wet Raney No. 28 nickel catalyst (75 gms on dry basis). The autoclave was pressure checked to 2000 psi with hydrogen for leaks. Afterwards, 100 gms of liquid ammonia was charged. The pressure was then adjusted to 400 psi with hydrogen gas and the autoclave was heated to 120°-130° C. where a pressure of 1600-1700 psi developed. Samples were pulled from the autoclave and analyzed until the reaction was near completion. After 30 minutes at 120°-130° C. the reactor was post-heated at 145°-150° C. for an additional 15 minutes. The autoclave was then cooled and the contents were emptied. The excess ammonia, toluene, and any N-propylamine were removed from the product under vacuum (15-30 mmHg) to give a colorless liquid. An IR spectrum of the final stripped bis-(-3-aminopropoxy)-N-propionamidodiisopropanolamine indicated that all the nitrile groups had been reduced. A potentiometric titration of the product with 1 N HCl resulted in a neutralization equivalent of 9.09 milliequivalents of HCl per/gm of product. The theoretical value for bis-(-3-aminopropoxy)-N-propionamidediisopropanolamine (MWT=318 g/mole) was calculated to be 9.43 milliequivalents of HCl per gm of amidotriamine which is in good agreement with the observed experimental value. The product was used without further purification.

EXAMPLE 3

To four beakers each containing 100 parts of epoxy resin based on diglycidyl ether of bisphenol A (n=0.2, WPE=185-195) were added the corresponding

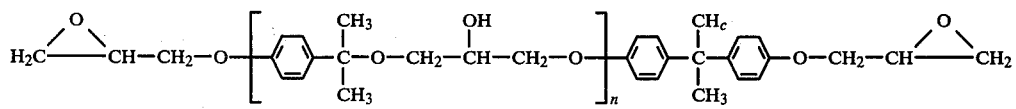

parts of bis-(-3-aminopropoxy)-N-propionamidodiethanolamine prepared in Example 1: 36 parts, 37 parts, 38 parts, and 39 parts. After mixing each beaker thoroughly for two minutes and centrifuging at a speed of 3000 rpm, these resin mixtures were placed in aluminum molds and were cured for 2 hours at 80° C. and for another 2 hours at 180° C. The crosslinked products had glass transition temperatures measured with a differential scanning calorimeter (Perkin Elmer Model DSC-2) as are summarized in the table below.

TABLE I

Glass Transition Temperature For Bis-(-3-Aminopropoxy)-N—propionamidodiethanolamine Assuming Only Four Reactive Amino Sites

| ENTRY | PHR | TG(° C.) |
|---|---|---|
| 1 | 36 | 69.9 |
| 2 | 37 | 74.9 |

TABLE I-continued

Glass Transition Temperature For Bis-(-3-Aminopropoxy)-
N—propionamidodiethanolamine Assuming Only Four Reactive
Amino Sites

| ENTRY | PHR | TG(° C.) |
|---|---|---|
| 3 | 38 | 78.4 |
| 4 | 39 | 69.9 |

EXAMPLE 4

To four beakers each containing 100 parts of epoxy resin based on diglycidyl ether of bisphenol A (n=0.2, WPE=185–195) were added the corresponding parts of amidotriamine prepared in Example 1: 24 parts, 25 parts, 26 parts, and 27 parts. The blends were then mixed, and analyzed according to the procedure given in Example 3. The cured product data is summarized in the following table.

TABLE II

Glass Transition Temperature For Bis-(-3-aminopropoxy)-N—
propionamidodiethanolamine Assuming Four Reactive Amino And
Two Reactive Amido-Sites

| ENTRY | PHR | TG(° C.) |
|---|---|---|
| 1 | 24 | 72.1 |
| 2 | 25 | 71.2 |
| 3 | 26 | 75.4 |
| 4 | 27 | 80.9 |

EXAMPLE 5

To five beakers each containing 100 parts of epoxy resin based on diglycidyl ether of bisphenol A (n=0.2, WPE=185–195) were added the corresponding parts of amidotriamine prepared in Example 1: 29 parts, 30 parts, 31 parts, 32 parts and 33 parts. The blends were then mixed and analyzed according to the procedure given in Example 3. The cured product data is summarized in the following table.

TABLE III

Glass Transition Temperature For Bis-(-3-Aminopropoxy)-N—
propionamidodiethanolamine Assuming Four Reactive Amino and
One Reactive Amido Sites

| ENTRY | PHR | TG(° C.) |
|---|---|---|
| 1 | 29 | 88.0 |
| 2 | 30 | 87.0 |
| 3 | 31 | 88.4 |
| 4 | 32 | 81.5 |
| 5 | 33 | 80.4 |

EXAMPLE 6

To four beakers each containing 100 parts of epoxy resin based on diglycidyl ether of bisphenol A (n=0.2, WPE=185–195) were added the corresponding parts of amidotriamine prepared in Example 2: 34 parts, 35 parts, 36 parts, and 37 parts. After mixing each beaker thoroughly for 2 minutes and centrifuging at a speed of 3000 rpm, these resin mixtures were placed in aluminum molds and were cured for 2 hours at 80° C. and for another 2 hours at 150° C. The crosslinked products had glass transition temperatures measured with a differential scanning calorimeter (Perkin Elmer Model DSC-2) as are summarized in the table below.

TABLE IV

Glass Transition Temperature For
Bis-(-3-aminopropoxy)-N—propionamido
Diisopropanolamine

| ENTRY | PHR | TG(° C.) |
|---|---|---|
| 1 | 34 | 67.4 |
| 2 | 35 | 68.9 |
| 3 | 36 | 68.9 |
| 4 | 37 | 68.8 |

EXAMPLE 7

To five beakers each containing 100 parts of epoxy resin based on diglycidyl ether of bisphenol A (n=0.2, WPE=185–195) were added the corrsponding parts of amidotriamine prepared in Example 2: 32 parts, 33 parts, 34 parts, 35 parts and 36 parts. The blends were then mixed and analyzed according to the procedure given in Example 6 except that the cure cycle was 2 hours at 80° C., 2 hours at 150° C. and another 2 hours at 180° C. The cured product data is summarized in the following table.

TABLE V

Glass Transition Temperature For Bis-
(-3-aminopropoxy)-N—propionamido-
diisopropanolamine (Extended Cure)

| ENTRY | PHR | TG(° C.) |
|---|---|---|
| 1 | 32 | 82.2 |
| 2 | 33 | 85.4 |
| 3 | 34 | 86.9 |
| 4 | 35 | 87.2 |
| 5 | 36 | 81.9 |

What is claimed is:

1. Aminoalkoxyamides having the following formula:

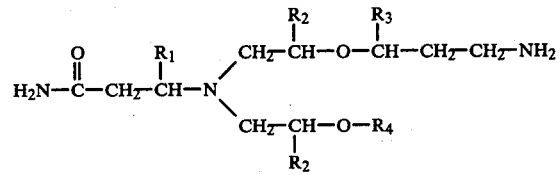

wherein $R_4$ is selected from H or

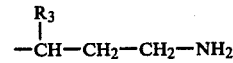

and $R_1$, $R_2$ and $R_3$ are all independently selected from H or a lower alkyl group having from 1 to about 6 carbon atoms.

2. The aminoalkoxyamides of claim 1, wherein $R_3$ is H.

3. An epoxy resin composition comprising an epoxy resin and at least one epoxy resin curing agent of the formula:

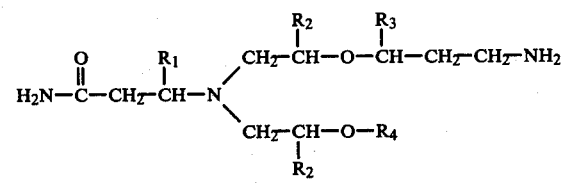

wherein $R_4$ is selected from H or

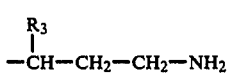

and $R_1$, $R_2$ and $R_3$ are all independently selected from H or a lower alkyl group having from 1 to about 6 carbon atoms.

4. The epoxy resin composition of claim 3, wherein said epoxy resin is selected from the polyepoxides having at least two

groups.

5. The epoxy resin composition of claim 4, wherein said

groups are terminal groups.

6. The epoxy resin composition of claim 5, wherein said epoxy resin is a diglycidyl ether of bis-phenol.

7. The epoxy resin composition of claim 3, wherein said epoxy resin curing agent is represented by the formula set forth in claim 3 and wherein $R_4$ is independently selected from H or

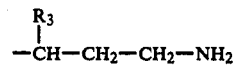

8. The epoxy resin composition of claim 7, wherein $R_3$ is H.

9. In a method for curing an epoxy resin composition comprising incorporating an epoxy resin curing agent into an epoxy resin and heating the combination of the epoxy resin and the epoxy curing agent, the improvement which comprises said epoxy resin curing agent being represented by the formula:

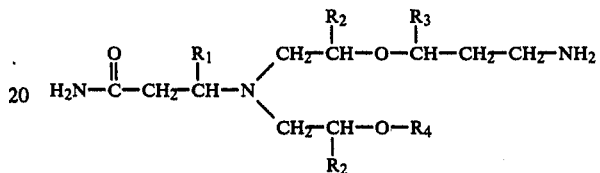

wherein $R_4$ is selected from H or

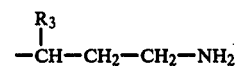

and $R_1$, $R_2$ and $R_3$ are all independently selected from H or a lower alkyl group having from 1 to about 6 carbon atoms.

* * * * *